(12) United States Patent
Jarvenkyla

(10) Patent No.: US 8,470,423 B2
(45) Date of Patent: Jun. 25, 2013

(54) PLASTICS PIPE

(75) Inventor: Jyri Jarvenkyla, Hollala (FI)

(73) Assignee: Uponor Innovation AB Industrivagen, Firstad (SE)

( * ) Notice: Subject to any disclaimer, the term of this patent is extended or adjusted under 35 U.S.C. 154(b) by 400 days.

(21) Appl. No.: 11/458,927

(22) Filed: Jul. 20, 2006

(65) Prior Publication Data

US 2007/0193643 A1 Aug. 23, 2007

Related U.S. Application Data

(63) Continuation-in-part of application No. PCT/IB2005/000134, filed on Jan. 20, 2005.

(30) Foreign Application Priority Data

Jan. 20, 2004 (GB) .................................. 0401183.9

(51) Int. Cl.
   *B32B 1/08* (2006.01)
   *B32B 15/08* (2006.01)

(52) U.S. Cl.
   USPC ...................................... 428/36.91; 428/36.9

(58) Field of Classification Search
   USPC .................... 428/34.9, 35.2, 209, 349, 479.4, 428/36.9, 36.91; 525/179
   See application file for complete search history.

(56) References Cited

U.S. PATENT DOCUMENTS

| | | | |
|---|---|---|---|
| 3,721,597 A * | 3/1973 | Colburn | 156/313 |
| 3,971,753 A * | 7/1976 | Frechtling et al. | 524/789 |
| 4,104,289 A * | 8/1978 | Jones | 523/211 |
| 4,454,258 A * | 6/1984 | Kawahara et al. | 523/116 |
| 4,632,959 A * | 12/1986 | Nagano | 525/70 |
| 4,818,782 A * | 4/1989 | Bissot | 524/413 |
| 4,999,903 A * | 3/1991 | Bujes | 29/469.5 |
| 5,132,344 A * | 7/1992 | Matteodo | 524/101 |
| 5,416,142 A * | 5/1995 | Bush et al. | 524/113 |
| 5,545,450 A * | 8/1996 | Andersen et al. | 428/34.5 |
| 5,549,867 A * | 8/1996 | Gessner et al. | 264/555 |
| 5,730,922 A * | 3/1998 | Babb et al. | 264/258 |
| 6,068,026 A | 5/2000 | Garois | |
| 6,231,936 B1 * | 5/2001 | Kozimor et al. | 428/34.7 |
| 6,465,543 B1 * | 10/2002 | Alexandre et al. | 523/213 |
| 2001/0008699 A1 * | 7/2001 | Bagrodia et al. | 428/475.2 |
| 2001/0031324 A1 | 10/2001 | Rosenberg | |
| 2002/0007861 A1 * | 1/2002 | Hansen et al. | 138/143 |
| 2002/0082352 A1 * | 6/2002 | Schmitz et al. | 525/179 |

FOREIGN PATENT DOCUMENTS

| | | |
|---|---|---|
| CH | 655986 A5 | 5/1986 |
| DE | 19509613 A1 | 9/1996 |
| EP | 0174611 A2 | 3/1986 |
| EP | 0581205 | 2/1994 |

(Continued)

OTHER PUBLICATIONS

Plastics Technology Online Website Nov. 2003 Issue. http://www.ptonline.com/articles/200311cu1.html.*

*Primary Examiner* — Erik Kashnikow

(74) *Attorney, Agent, or Firm* — Jeffrey G. Sheldon; Sheldon Mak & Anderson

(57) ABSTRACT

A plastics pipe having a stabilized inner layer, wherein the inner layer comprises an extruded thermoplastic polymer comprising at least one polar stabilizer, wherein:
  (i) the thermoplastic polymer is provided with pendant polar functional groups, and/or
  (ii) the thermoplastic polymer comprises an effective amount of at least one filler provided with pendant polar functional groups, and/or
  (iii) the thermoplastic polymer comprises a blend of a non-polar thermoplastic polymer and a thermoplastic polymer provided with pendant polar functional groups.

71 Claims, 15 Drawing Sheets

Dowlex 2344

FOREIGN PATENT DOCUMENTS

| | | |
|---|---|---|
| EP | 0644031 A2 | 3/1995 |
| EP | 1216823 A2 | 6/2002 |
| JP | 5293870 | 11/1993 |
| WO | WO 03/037981 A1 | 5/2003 |

* cited by examiner

PLASTICS PIPE

CROSS-REFERENCE TO RELATED APPLICATIONS

This application claims priority from International Application Number PCT/IB2005/000134, titled "PLASTICS PIPE" and filed on Jan. 20, 2005, and from UK Patent Application Number 0401183.9, titled "PLASTICS PIPE" and filed on Jan. 20, 2004, the contents of which are incorporated in this disclosure by reference in their entirety.

FIELD OF THE INVENTION

This invention relates to plastics pipes, and more particularly to plastics pipes formed from extruded thermoplastic polymers.

BACKGROUND OF THE INVENTION

Extruded polyolefin pipes are well known for a variety of industrial applications. Typically they are used in the building industry for domestic water pipes, radiator pipes, floor-heating pipes and for similar applications in ship building etc. Polyolefin pipes can also be used as district heating pipes and as process pipes in the food industry etc. Other applications include the conveyance of gaseous fluids and slurries.

Multilayer pipes wherein at least one of the layers comprises an extruded polyolefin are also well known and a great many have been described in the literature. Multilayer pipes are used, for example, when improved long term strength at elevated temperatures is needed or, when barrier properties against oxygen permeation are necessary. Multilayer pipes can comprise dissimilar materials for particular applications. For example, multilayer pipes having diffusion barrier layers have been proposed. The diffusion barrier can be a polymeric layer such as EVOH, or a metallic layer which provides both a diffusion barrier and a strengthening layer.

In recent years multilayer pipes having aluminium based barrier layers have become very popular. When installing domestic heating systems the metal barrier provides a specific and important benefit, which is that when the pipe is bent it retains its new configuration, in contrast to plastics pipes without a metal barrier layer, which tend to recover their original shape.

However, multilayer plastics pipes comprising two or more layers of polyolefin homopolymers or copolymers having an intermediate metallic barrier or strengthening layer disposed between them tend to have poorer performance over the long-term than, for example, PEX pipes, comprising a single layer of cross-linked polyethylene. In addition, the difference between the coefficients of thermal expansion of a metallic barrier layer and the plastics layers can lead to delamination. Nevertheless, the presence of a metal barrier layer is often very desirable in certain applications of plastics pipes, for example, in domestic and district heating and in the oil, petroleum and gas industries. Multilayer plastics pipes with metal barrier layers also find use in cold water applications where potable water needs to be protected from aromatic substances found in the soil.

A further benefit of plastics pipes with metallic barrier layers is that the metal layer prevents UV light from reaching the inner plastics layer(s) beneath it, thereby protecting these layer(s) from UV degradation. This protection obviates the need for the addition of UV stabilisers to the inner layer(s) and enables the stabiliser packages of the inner and outer plastics layers to be optimised, with the inner layer(s) requiring only thermal and chemical stabilisation. Examples of plastics pipes having metal barrier and strengthening layers and methods for their manufacture are disclosed in the following patents:

| CH | 655986 |
| JP | 93-293870 |
| EP | 0644031 |
| EP | 0353977 |
| EP | 0581208 |

The entire disclosures of which are incorporated herein by reference for all purposes.

Typical multilayer pipe constructions consist of five layers where the innermost layer comprises, for example, PE-RT (polyethylene for higher temperatures), which is overlaid with a first adhesive layer, an overlapped or butt welded aluminium strengthening and barrier layer, a second adhesive layer and an outer layer of PE-RT or silane cross-linked PEX (cross-linked polyethylene). The adhesive layers are necessary because many polymers, including polyolefins, have very poor adhesion to aluminium.

This construction has several drawbacks. Firstly the inner plastics layer and the first adhesive layer are together rather thin and in some manufacturing processes the thickness of the first adhesive layer is difficult to control.

Secondly the first adhesive layer is usually made of a thermoplastic polymer that is mechanically weaker than the inner plastics layer and hence does not improve the long-term hydrostatic strength of the pipe. This means in practice that omitting the first adhesive layer would provide advantages in the form of improved long term strength, easier quality control and easier extrusion tool design.

Thirdly, in manufacturing processes wherein the inner plastics layer is directly extruded into a freshly formed and welded aluminium tube comprising the barrier layer, the thermal shrinkage of the hot extruded inner plastics layer tends to cause delamination, requiring the use of a high strength adhesive as the first adhesive layer.

It has been proposed to limit the thermal shrinkage of a thermoplastic polymer by compounding relatively large particle size fillers into the polymeric matrix. However, the loading level needs to be rather high in order to reach the desired effect and this reduces the flexibility of the pipe. The use of high levels of filler also introduces further problems, including the difficulty of obtaining good wetting of the filler by the polymeric matrix, which is necessary in order to obtain good mechanical properties. Polyolefins, for example, are non-polar and incompatible with hydrophilic fillers. Thus, poor adhesion between the filler surface and the matrix is a frequent outcome.

Some improvement in the wetting of the filler surface by the polymeric matrix may be obtained by the use of coating agents, for example, fatty acids such as stearic acid, and salts of fatty acids, which can react with, for example, hydroxyl groups on the filler surface, but further improvements would be highly desirable.

Stabilisation of thermoplastic polymers is usually accomplished by melt blending with one or more stabilisers. In this way a heterophase polymer/stabiliser system is formed, which may be best described as a physical dispersion of a low molecular weight stabiliser in a polymer matrix. The vast majority of commercial stabiliser compounds have very different chemical structure from that of the non-polar host thermoplastic polymer. For this reason, the compatibility of various conventional stabilisers with polyolefins is poor, leading to migration of admixed stabilisers across the boundary of the polyolefin with neighbouring fluids, liquids, gases or solid materials. This loss of stabiliser substantially shortens the lifetime of the polyolefin. The migration of stabilisers into drinking water can also have unpredictable toxic effects on consumers.

The long-term performance of plastics pipes is typically evaluated using the SEM method where the pipe is pressurised at elevated temperatures and the time to burst is measured at different stress levels. Considerable research effort has been focused on so-called stage III ruptures, which take place when the stabiliser package has ceased to be effective. If the stabilisers can migrate and leach out of the matrix easily the long-term endurance of the pipe is jeopardised.

A method for studying stabiliser migration involves immersing the pipe in boiling water with subsequent measurement of the oxidation induction time (OIT) level, which gives an indication of how much active stabiliser is remaining in the pipe and measures how easily the stabiliser is able to leach out of the pipe wall. By measuring the OIT levels at different time intervals it is possible to estimate by extrapolation the lifetime of the pipe.

In US2001/0031324 there is described a plastic pipe comprising:

a tubular body comprised of an outer layer, an intermediate layer connected radially inwardly to the outer layer, and an inner layer connected radially inwardly to the intermediate layer, wherein the inner layer is in contact with a medium to be transported;

wherein the inner and the outer layer are comprised of a basic material and the intermediate layer is comprised of a composite material of a basic material and an additional material, wherein the basic material of the inner layer and of the intermediate layer is a polymer material, wherein the polymer material comprises amorphous areas;

additives against aggressive media embedded in the amorphous area of the polymer material of at least one of the inner layer and the intermediate layer;

wherein the additional material is a barrier material, selected from the group consisting of fillers and additives, embedded in the amorphous area of the polymer material of the intermediate layer and configured to reduce migration of the additives embedded in the amorphous area of the polymer material of the inner layer.

The barrier material proposed in US2001/0031324 is selected from glass fibres, glass beads, glass powder or mixtures thereof. It will be apparent that the presence of the barrier material in the intermediate layer does not prevent the additives against aggressive media present in the inner layer from leaching out into the transported medium.

It is apparent that there are several problems associated with existing multilayer plastics pipe constructions. In particular, improvements in adhesion of the inner polymer layer to any barrier or strengthening layer present and in reducing stabiliser leaching and migration would be highly desirable.

BRIEF SUMMARY OF THE INVENTION

According to the present invention, a plastics pipe of improved performance comprises at least an inner thermoplastic polymer layer, which comprises a stabiliser and is made more polar by the presence of functional groups.

In a first aspect, the present invention provides a plastics pipe having a stabilised inner layer, wherein the inner layer comprises an extruded thermoplastic polymer comprising at least one polar stabilizer, wherein:

(i) the thermoplastic polymer is provided with pendant polar functional groups, and/or (ii) the thermoplastic polymer comprises an effective amount of at least one filler provided with pendant polar functional groups, and/or (iii) The thermoplastic polymer comprises a blend of a non-polar thermoplastic polymer and a thermoplastic polymer provided with pendant polar functional groups.

In a second aspect, the invention provides a method of producing a plastics pipe having a stabilised inner layer, which comprises extruding a polymeric composition comprising a thermoplastic polymer comprising at least one polar stabiliser, wherein:

(i) the thermoplastic polymer is provided with pendant polar functional groups, and/or (ii) the thermoplastic polymer comprises an effective amount of at least one filler provided with pendant polar functional groups, and/or (iii) The thermoplastic polymer comprises a blend of a non-polar thermoplastic polymer and a thermoplastic polymer provided with pendant polar functional groups, to form at least an inner layer of the plastics pipe.

In a first preferred embodiment, the plastics pipe of the invention is a multilayer pipe that comprises an inner polymeric layer and an outer barrier layer surrounding the inner polymeric layer, the inner polymeric layer comprising an extruded thermoplastic polymer comprising at least one polar stabiliser, wherein:

(i) the thermoplastic polymer is provided with pendant polar functional groups, and/or (ii) the thermoplastic polymer comprises an effective amount of at least one filler provided with pendant polar functional groups, and/or (iii) The thermoplastic polymer comprises a blend of a non-polar thermoplastic polymer and a thermoplastic polymer provided with pendant polar functional groups.

DRAWINGS

These and other features, aspects and advantages of the present invention will become better understood with regard to the following description, appended claims, and accompanying figures where:

Figure 11:
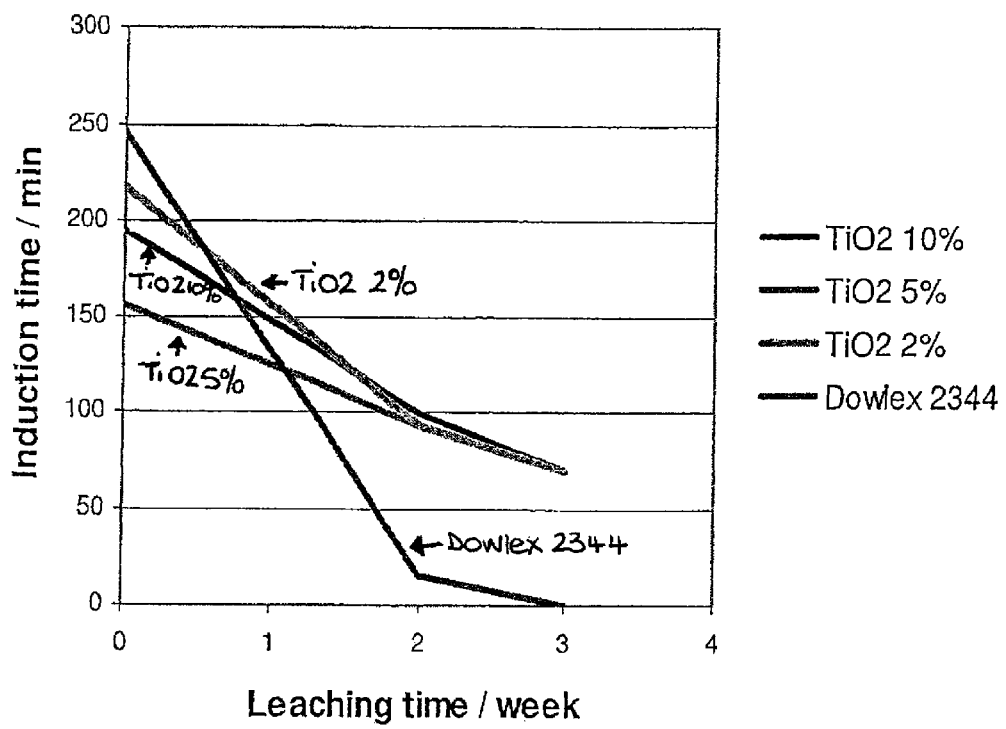
Figure 12:
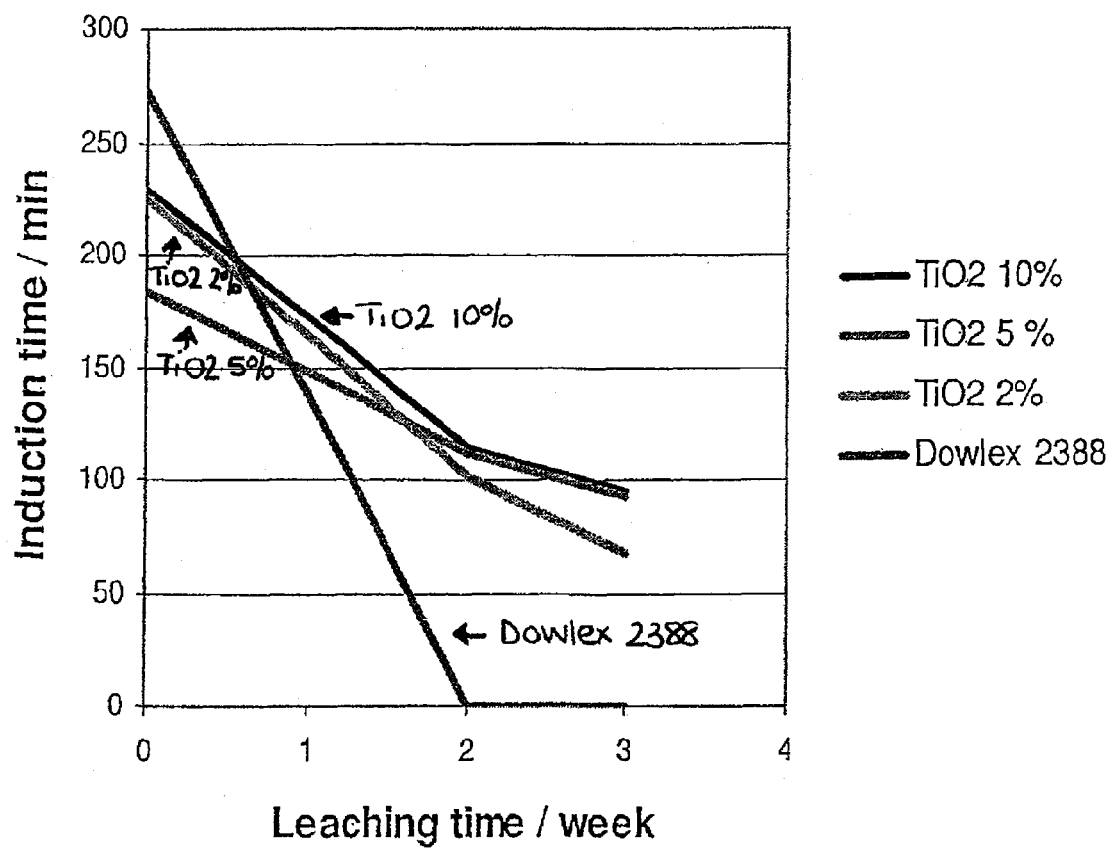

FIGS. 10 *a*, *b*, *c* and *d* illustrate the results of oxidation induction tests on layered silicate filler and aluminium trihydroxide filler; and FIG. 11 and FIG. 12 show plots of induction time (measured by the oxidation induction test) against time for different quantities of titanium dioxide filler added to stabilized polyethylene compositions.

All dimensions specified in this disclosure are by way of example only and are not intended to be limiting. Further, the proportions shown in these Figures are not necessarily to scale. As will be understood by those with skill in the art with reference to this disclosure, the actual dimensions of any device or part of a device disclosed in this disclosure will be determined by their intended use.

DETAILED DESCRIPTION OF THE INVENTION

In the plastics pipe of the invention, at least the inner layer of the pipe comprises the thermoplastic polymer comprising at least one polar stabiliser. In certain embodiments the entire pipe wall comprises the stabilised thermoplastic polymer as aforesaid, so that the entire pipe is composed of the same material as its inner layer. In other embodiments the pipe wall will have a plurality of layers, and the pipe is then known as a multilayer pipe.

By a "multilayer pipe" in this specification is meant a pipe having two or more layers, at least one of which layers can be a barrier or strengthening layer, for example, to improve the rigidity of the pipe. A multilayer pipe has an inner layer, which is in direct contact with the fluidic material (gas, liquid or slurry) conveyed by the pipe, and an outer layer, which may be in contact with the environment, or which may be surrounded by additional outer layer(s). In certain preferred embodiments the multilayer pipe has a polymeric or metallic barrier layer disposed between the plastic inner layer and one or more additional outer layers. The metallic barrier layer can not only increase the rigidity of the multilayer pipe but also act as a barrier to gases, especially oxygen, and migration of stabilisers and other additives.

In another preferred embodiment, the thermoplastic polymer is a non-polar polymer and has incorporated therein filler, the filler being provided with pendant polar functional groups.

By "non-polar polymer" in this specification is meant a thermoplastic polymer wherein the polymeric component is substantially devoid of polar groups, that is to say, asymmetric groups having polar covalent bonds. The non-polar polymer can comprise a polyolefin polymer, for example, polyethylene, polypropylene, polybutylene, and higher olefinic polymers; copolymers of ethylene, propylene, 1-butene, 2-butene, 1-pentene, 1-hexene, 1-heptene and 1-octene and isomers thereof with each other and with other olefinically unsaturated monomers, olefinically unsaturated aromatic polymers, such as polystyrene and styrene copolymers; and such like materials. Block copolymers and polymer blends of polymerised monomers of any of the above-mentioned polymers are also included. Cross-linked polymers and cross-linked polymer blends can also be used, especially cross-linked polyolefins and cross-linked blends of polyolefins.

Preferred non-polar polymers for use in the present invention include polyethylene and polypropylene.

The grade of polyethylene (PE) chosen, that is to say, high density, medium density, low density, or linear low density, will depend upon the particular application and the properties required. Preferred grades of polyethylene for use in the present invention comprise those meeting the requirements of at least one of pressure pipe specifications prEN 12201-1, prEN12201-2, prEN1555-1 and prEN1555-2 is. The grade of polyethylene known as PE100 is especially preferred. Any other suitable equivalent grade of polyethylene may, of course, also be used. Cross-linked polyethylenes such as PEX and PEXO can also be advantageously used.

Preferably the polypropylene (PP) is a polypropylene homopolymer, preferably with a narrow molecular weight distribution (MWD), and preferably with a low crystallinity. Preferably the polypropylene homopolymer comprises at least 70 weight percent of fractions having a weight average molecular weight of at least $7 \times 10^5$. The inner layer polymer blend can comprise, for example, a random polypropylene (PP). An example of a random polypropylene pipe composition is described in WO 03/037981, the entire disclosure of which is incorporated herein by reference for all purposes.

In another preferred embodiment of the invention, the thermoplastic polymer comprises a polar functional polyolefin. In this specification, a "polar functional polyolefin" is defined as a semi-crystalline polyolefin polymer comprising amorphous regions, wherein pendant functional polar substitutent groups, and especially functional substitutent end groups, are present within the amorphous regions. Polar functional substitutent groups comprise at least one polar covalent bond in which the electrons are not shared equally because one atom attracts them more strongly than the other. The bond therefore has a permanent dipole moment. Typically polar functional substitutent groups are asymmetric and comprise at least one hetero-atom, for example, O, N, S, or P. Functional groups in this specification are defined as substitutent groups that, when present in a polymeric matrix, are capable of interacting with substitutent groups on other molecules in order to bond thereto by intermolecular forces of attraction. Such forces include, for example, Van der Waals forces (including dispersion forces and dipole-dipole interactions), hydrogen bonding, ionic bonding, co-ordinate (dative covalent) bonding, and any combination thereof.

The polar functional polyolefin polymer can be produced by co-polymerisation of an olefin with an olefinically unsaturated comonomer having the desired polar functional substitutent group. Suitable comonomers include, for example, unsaturated aliphatic or aromatic acids, anhydrides, esters, and alcohols.

Preferred polar functional polyolefin polymers include, for example, acrylic acid functionalised polyolefins, for example, polypropylene (PP-g-AA), and maleic anhydride functionalised polyolefins, for example, polyethylene (PE-g-MAH), polypropylene (PP-g-MAH and PR-g-MAH) and ethylene-propylene rubber (EPR-g-MAH). Polyolefins can also be functionalised by the introduction of oxy, epoxy and —OH groups. For example, copolymers of ethylene and 10-undecenol yield (PE-co-OH1) type functional polyolefin polymers. Other comonomers that can be used to functionalise olefin polymers include butyl acrylate and especially glycidyl methacrylate.

The functionality of the polar functional polymer can be expressed as the weight percent of the comonomer (typically having a —COOH or —OH group) present. Preferably the olefinically unsaturated comonomer is present in at least 0.01 weight percent, more preferably at least 0.1 weight percent, especially from 1 to 20 weight percent, most preferably from 1 to 10 weight percent, based on the total weight of the polyolefin polymer. In other embodiments, the polar functional polyolefin polymer can be produced by grafting, in particular by radiation grafting or free radical grafting, of polar functional groups onto a polyolefin backbone. In such polymers the functionality can be expressed as the weight percent of notional comonomer present.

In one preferred embodiment the polar functional polyolefin polymer is a polar functional polypropylene. Suitable polar functional polypropylenes include, for example, oxypolypropylene (containing peroxide groups in the polymer chains) manufactured by Basell, BB125E manufactured by Borealis (PP-g-MAH)(MAH~0.5% per weight) and Polybond 1002 manufactured by Uniroyal (PP-g-AA) (AA~6.0% per weight).

In another preferred embodiment the polar functional polyolefin polymer is a polar functional polyethylene. Suitable polar functional polyethylenes include, for example, ethylene/glycidyl methacrylate (E/GMA) copolymers such as AX 8840 (Atofina).

In a preferred embodiment the inner layer of the multilayer pipe comprises a blend of a non-polar semi-crystalline polyolefin polymer and a polar functional polyolefin polymer. In one such embodiment the non-polar semi-crystalline polyolefin polymer is present in a major amount of at least 50 weight percent, preferably from 80 to 99 weight percent. In another embodiment the non-polar semi-crystalline polyolefin polymer is present in a minor amount of less than 50 weight percent, preferably from 1 to 20 weight percent.

In another preferred embodiment, the inner layer comprises a blend of a polypropylene (PP) and a polar functional polypropylene. Preferably the polar functional polypropylene is present in the blend in a minor amount, more preferably in an amount of from 3 to 20 weight percent, especially from 5 to 15 weight percent, most preferably around 10 weight percent, based on the total weight of the blend.

Preferably the polypropylene (PP) is a polypropylene homopolymer, preferably with a narrow molecular weight distribution (MWD), and preferably with a low crystallinity. Preferably the polypropylene homopolymer comprises at least 70 weight percent of fractions having a weight average molecular weight of at least $7 \times 10^5$.

The inner layer polymer blend can comprise, for example, a random polypropylene (PP). An example of a random polypropylene pipe composition is described in WO 03/037981, the entire disclosure of which is incorporated herein by reference for all purposes.

Preferably the polypropylene (PP) has a high molecular weight with a narrow molecular weight distribution and the polar functional polypropylene has a lower molecular weight and a narrow molecular weight distribution. With an appropriate selection of molecular weights such a combination can form a bimodal material with good strength properties which is nevertheless easy to extrude.

In yet another preferred embodiment according to the invention, the inner layer comprises a blend of a polyethylene polymer, for example, PE-RT, and a polar functional polyethylene polymer. Preferably the polar functional polyethylene is present in the blend in a minor amount, more preferably in an amount of from 0.5 to 20 weight percent, most preferably around 10 weight percent, based on the total weight of the blend. Preferably the polyethylene polymer blend is cross-linked, for example, by the addition of a chemical cross-linking agent, or by radiation or silane cross-linking.

In a still further preferred embodiment, the inner layer comprises a blend of a polar functional polypropylene admixed with from 2 to 20 weight percent, for example, about 10 weight percent, of linear low density polyethylene.

In the first preferred embodiment of the invention the plastics pipe is provided with an outer, preferably impermeable, barrier layer surrounding the inner polymeric layer. The outer barrier layer is preferably a metallic layer and is preferably also a strengthening layer, producing a substantially rigid pipe. The outer barrier layer can comprise, for example, aluminium, stainless steel, copper, or any other suitable metal. The metal can comprise a welded sheet, for example, a welded aluminium sheet. In other embodiments the metal layer can be sputtered, sprayed, plasma-coated, galvanically-coated or electro-deposited, or can comprise a wound and/or corrugated metal sheet. Preferably the outer barrier layer is directly bonded to the inner polymeric layer, although it is also possible for the barrier layer to be bonded to the inner polymeric layer through an adhesive layer, as will be more fully described hereinafter.

The barrier layer can also comprise or consist of polymeric and/or ceramic layers.

Preferably the inner polymeric layer comprises a polymeric matrix provided with functional groups that also increase the wetting of the metal barrier layer by the polymeric matrix. Such groups can, for example, decrease the contact angle of the polymeric matrix with the metal barrier layer.

In a further and independent aspect of the invention, it is also possible to modify the surface of the metal barrier layer to improve its wetting behaviour. The metal barrier layer can be treated, for example, by physical surface modification, for example, plasma treatment, abrasion, ablation, or cleaning; or by chemical surface modification, for example, solvent or chemical cleaning, treatment with chemical modifying agents to introduce surface functional groups, deposition of surface layers by, for example, plasma deposition of a polymeric layer containing functional groups, deposition of a glassy layer, or other surface coating techniques. Such techniques are particularly preferred where they permit direct bonding of the inner polymeric layer to the metal barrier layer and enable the separate adhesive layer or layers to be omitted.

By a "polar stabiliser" in this specification is meant a stabiliser comprising at least one functional polar group comprising at least one polar covalent bond. Typically functional polar groups are asymmetric and comprise at least one heteroatom, for example, O, N, S, or P.

Without been bound by any particular theory it is believed that in certain preferred embodiments of the invention the migration and leaching of the polar stabiliser from the polyolefin matrix is substantially reduced by interaction with the polar groups on the thermoplastic polymer and/or the filler.

Stabilisers suitable for use in the present invention include polar compounds known to impart improved thermal stability to thermoplastic polymers, compounds with antioxidant properties, radical scavengers, anti-ageing compounds and compounds which act as light and UV stabilisers. Preferably the stabilisers also have low toxicity and good organoleptic properties. One or more stabilisers or co-stabilisers can be employed in any suitable combinations in order to achieve the desired properties. For example, the co-stabiliser could have lesser hydrophobicity than the thermal stabiliser.

Examples of preferred polar stabilisers include phenolic antioxidants, particularly high molecular weight sterically-hindered phenols, for example, pentaerythritol tetrakis(3-(3, 5-di-tert-butyl-4-hydroxyphenyl)propionate, Ethanox®330 manufactured by Ethyl Corporation, Irganox®1076, Irganox®3114 and Irganox®1010 manufactured by Ciba-Geigy and Cyanox®1790 manufactured by American Cyanamid.

The sterically-hindered phenolic stabilisers can be used together with co-stabilisers acting as hydroperoxide decomposers, for example, Cyanox®1212 manufactured by American Cyanamid.

Other useful stabilisers include phosphites, for example, tris(2,4-di-tertiary-butylphenyl) phosphite, phosphonites and benzotriazoles. Useful light and UV stabilisers include sterically-hindered amines, for example, piperidine compounds such as those based on tetramethyl piperidine.

A particularly preferred polar stabiliser possessing a long chain hydrocarbon moiety is Irganox®1076, which has the formula;

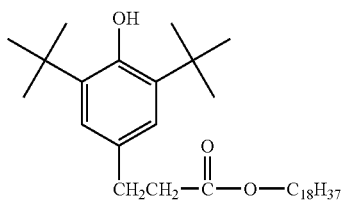

Preferably the stabiliser is present in the inner polymeric layer in an amount of from 0.01 to 5 weight percent, more preferably from 0.1 to 1 weight percent, based on the weight of the inner polymeric layer.

By "filler" in this specification is meant a particulate, inorganic-based or organic material which is dispersed in a polymeric matrix to improve mechanical properties, provide reinforcement, increase bulk, or reduce cost.

Preferably the filler comprises platelets and/or has a high aspect ratio.

Without wishing to be bound by any particular theory, it is believed that the action of the filler is two-fold. On the one hand, the filler can reduce the tendency of the thermoplastic polymer to shrink on cooling after extrusion. This reduces the possibility of shrink-back and delamination from the metallic barrier layer (where present) and may permit direct extrusion of the inner layer against the metallic barrier layer without the need for additional adhesive layers, which tend to weaken the construction.

Further, without wishing to be being bound by any particular theory, it is believed that the filler particles and the polar stabiliser molecules tend to reside in the amorphous regions of the semi-crystalline thermoplastic polymer matrix of the inner layer where the stabiliser may interact with functional groups on the polar functional polyolefin (where present) forming physical entanglements and intermolecular attractions.

In these regions the filler particles possibly act in two ways. Firstly as permeation modifiers, creating long and tortuous migration path lengths for the stabiliser molecules and maintaining a physical barrier preventing the stabiliser molecules from reaching the surface of the polymer matrix. Secondly, pendant polar groups on the filler particles (where present) may form intermolecular attractions with polar groups on the stabiliser. In particular it is believed that polar stabilisers having long chain aliphatic groups may act as wetting agents for the surface of the filler. At first the wetting of the filler surface by the stabiliser may deactivate the stabiliser in part, but the subsequent release of the stabiliser from the filler over time can improve the long term stability of the polymer. In preferred embodiments of the invention migration and leaching of the polar stabiliser can therefore be substantially reduced by the combination of (1) the physical barrier and attraction of the filler particles and (2) the physical barrier of the outer metallic layer. This is particularly advantageous when the plastics pipe of the invention is employed in, for example, conventional hot water systems.

Furthermore, by retaining the stabiliser molecules within the polymer matrix the attack of catalytic metal ions and the oxidising attack by oxygen, acids, and bases as well as of free chlorine and other halogens can be successfully counteracted even at elevated temperatures, and the resistance of the inner layer of the multilayer pipe against these media can be accordingly increased.

Preferred fillers for use in the present invention are inorganic-based fillers. Any suitable inorganic-based filler can be used in the inner layer of the multilayer pipe of the invention. Examples include talc, mica, calcium carbonate, kaolin, clay, magnesium hydroxide, calcium silicate, carbon black, graphite, iron powder, silica, diatomite, titanium oxide, iron oxide, pumice, antimony oxide, dolomite, dawsonite, zeolitic filler, vermiculite, montmorillonite, hydrated alumina, and the like. These fillers may be subjected to various surface treatments with organic wetting or coating agents as appropriate to introduce pendant polar groups. Mixtures of different fillers can also be used.

The inorganic-based filler preferably has a mean particle diameter of up to 10 μm, more preferably up to 4 μm. If the mean particle diameter of the inorganic-based filler exceeds 10 μm, the inorganic-based filler tends to show poor dispersability resulting in a failure to provide a reinforcing effect. The mean particle diameter of the filler may be determined by a laser diffraction scattering method.

By "an effective amount" in this specification is meant that the filler is present in an amount sufficient to reduce the delamination of the inner layer from the barrier layer (where present), or in an amount sufficient to reduce the leaching of the stabiliser (where present) from the polymer material, or both.

The inorganic-based filler(s) content of the inner polymeric layer is preferably from 0.1 to 25 weight percent, preferably from 0.5 to 25 weight percent, more preferably from 0.5 to 20 weight percent, based on the weight of the polymeric matrix. If the filler content is less than 0.5 weight percent, the resulting product may be insufficiently reinforced for some applications. If it exceeds 25% by weight, polymer-free regions between inorganic-based filler particles may be enlarged to an extent that impairs the reinforcing effect. Most preferably the filler content is from 1 to 15 weight percent, based on the weight of the polymeric inner layer.

Preferred fillers are those having pendant functional polar groups, for example, hydroxyl groups, on their surface, or which have been treated to produce such surface functional groups. Surface functional groups are those capable of interaction, either chemical or physical, with the polymeric matrix and/or the polar functional groups on the stabiliser or polar functional polyolefin polymer (if present), or both. Among the above-listed fillers, talc, mica and titanium dioxide are particularly preferred.

Especially preferred are fine grades of talc or other platelet (flake) formed fillers having a particle size in the range of 0.01 to 200 μm, preferably 0.1 to 10 μm, a maximum equivalent diameter of about 25 μm, and an average thickness of less than 0.5 μm. The talc is preferably present in an amount of from 1 to 5 weight percent, based on the weight of the inner polymeric layer. When mica filler is used, preferably it is present in an amount of less than 5 weight percent, based on the weight of the inner polymeric layer, the mica preferably having a particle size of less than 74 μm and an aspect ratio of from 10 to 150 μm.

Calcium carbonate, optionally treated at its surface with a fatty acid coating agent, is also preferred for its ability to improve the impact resistance of the polymeric matrix. Calcium carbonate can also interact with chlorine ions and can therefore also improve the stability of the thermoplastic polymer where chlorine is present, for example, in domestic water supplies. Suitable fatty acids having good processability include those having a carboxyl group attached to a terminal of a straight-chain alkyl or alkenyl residue containing from 5 to 30 carbon atoms. Specific examples include oleic acid, elaidic acid, stearic acid, eicosanoic acid, undecanoic acid, erucic acid, behenic acid, linoleic acid and the like. This surface treatment is, however, not always necessary where a thermoplastic polymer provided with polar functional groups is present because the polar functional groups can also improve the wetting of the filler particles by the thermoplastic polymer matrix.

Where calcium carbonate is used as the inorganic-based filler, its content in the polyolefin polymer matrix is preferably within the range of 0.5 to 20 weight percent, based on the weight of the inner polymeric layer.

In preferred inorganic-based filler, calcium carbonate is used as a co-filler together with talc.

In another especially preferred embodiment of the invention, the filler comprises titanium dioxide. The titanium dioxide filler can be coated or encapsulated with, for example, stearic acid, for processability, or with a polymer comprising pendant polar groups, or chemically treated to introduce different polar groups if necessary. Excellent results have been obtained using stabilised polyethylene and titanium dioxide filler.

In yet another preferred embodiment of the invention the filler comprises hydrated alumina or aluminium hydroxide. The hydrated alumina or aluminium hydroxide filler preferably has an average particle diameter of from 0.1µ to 5µ and a specific surface area of from 1 to 10 m$^2$/g. The hydrated alumina or aluminium oxide filler can be coated or encapsulated with, for example, stearic acid, or a polymer comprising pendant polar groups, or chemically treated to introduce different polar groups if necessary.

Particularly preferred fillers for use in the present invention are nano-sized fillers. In this specification, nanofillers are defined as materials having one dimension below 200 nm. The use of nanofillers is especially preferred because in general the required loading levels are much lower than for conventional fillers. It is believed that the improved results obtained using nanofillers are due in part to their extremely high aspect ratio compared to conventional fillers. Due to their small particle size, nanofillers can also insert themselves into the amorphous regions between the crystalline lamellae of the thermoplastic polymer and thereby improve the morphology thereof. The use of nanosized fillers in the inner layer of the plastic multilayer pipe can give better adhesion to the outer metallic barrier layer and at the same time the thermal shrinkage of the polymeric matrix can be reduced.

Without wishing to be bound by any particular theory, it is believed that the nanofillers can have up to three possible modes of action. Firstly the nanofiller particles can impede oxygen migration into the polymer. Secondly the nanofiller particles can retain the stabiliser molecules on their surfaces and release them over time. Thirdly the nanofiller particles can provide a physical barrier to impede the stabiliser molecules and possibly any remnants or by-products of any cross-linking reactions from leaching out of the inner polymer layer, thereby improving the organoleptic properties of the plastics pipe.

Especially suitable nanofillers can be derived from inorganic materials, for example, titanium dioxide, intercalated and exfoliated (delaminated) clays (layered silicates), calcium carbonate, calcium phosphate, silicon carbide SiC (nanowhiskers) and silica SiO2. Nanotube fillers can also be used, for example, carbon nanotubes and nanotubes formed from synthetic polymers.

The nanofiller is preferably used in an amount of from about 0.5% to about 5% by volume, more preferably from about 1% to 5% by volume, based on the volume of the inner polymeric layer. The nanofiller particles are preferably substantially uniformly dispersed in the inner polymeric layer. Where the nanofiller is a layered silicate, preferably at least 50% of the nanofiller particles are less than about 20 layers thick, the layers of the nanofiller particles having a unit thickness of from about 0.7 nm to 1.2 nm.

In one embodiment of the invention, the nanofiller is a layered silicate. Polymer-layered silicate composites can be divided into three general types: composites where the layered silicate acts as a normal filler, intercalated nanocomposites consisting of a regular insertion of the polymer material in between the silicate layers and exfoliated nanocomposites where 1 nm-thick layers are dispersed in the polymer material forming a monolithic structure on the microscale. All three types can be used in the plastics pipes of the present invention. Layered silicates are believed to be especially beneficial in polymer compositions in accordance with the invention due to their large surface area in comparison with some other fillers.

Any suitable layered silicate filler can be used in the plastics pipe of the invention. In this specification, the term "layered silicates" includes natural clays and minerals, for example, montmorillonite and talc, and also synthesized layered silicates such as magadiite, mica, laponite, and fluorohectorite. The preferred layered silicates are montmorillonites, and more preferably cloisite. These layered silicates may be subjected to various surface treatments with organic wetting or coating agents as appropriate to introduce pendant polar groups. Mixtures of different layered silicates, and mixtures of layered silicates with other fillers, can also be used.

The layered silicate nanofiller can be subjected to an organophilic treatment to give a thermally stable layered silicate. For example, smectite minerals, such as montmorillonite, or fluorinated synthetic mica, can be treated with trialkylimidazolium salt derivatives having propyl, butyl, decyl, and hexadecyl alkyl chains attached to the imidazolium through one of the nitrogens to give imidazolium-treated layered silicates. In other procedures cation exchange is carried out with alkyl amines in acid media. The alkyl amine can, for example, comprise a long alkyl chain and two short alkyl groups, for example, methyl groups. Examples of suitable alkyl amines include, N-methyundecenylamine and octadecylamine.

Preferably the layered silicate nanofiller comprises particles having one average dimension of 0.002 to 1 µm and a thickness of 0.6 to 2.0 nm. Preferably the layered silicate nanofiller particles are uniformly dispersed in the polyolefin polymer and have an average interlayer distance of 2.0 nm or more. In this context, the interlayer distance refers to the distance between the gravity centers of flat plates of the layered silicate, and uniform dispersion refers to the dispersed state in which each one sheet of the layered silicate or a multilayer of 5 layers or less on an average exists in parallel or randomly, or where parallel and random states exist in mixture, with 50% or more, preferably 70% or more, thereof forming no local mass. The most preferred layered silicate fillers preferably have a mean particle diameter of up to 10 µm, more preferably up to 4 µm. If the mean particle diameter of the filler exceeds 10 µm, the filler tends to show poor dispersability resulting in a failure to provide a reinforcing effect. The mean particle diameter of the filler may be determined by a laser diffraction scattering method.

Examples of suitable nanofillers include montmorillonites, such as Cloisite 6A and Cloisite 15A (sodium montmorillonite modified with a quaternary ammonium salt) manufactured by Southern Clay Products Inc.

Preferably a compatibiliser for the nanofiller is be added to the polymeric composition to increase adhesion between the filler and the thermoplastic polymer, for example, maleic anhydride modified polypropylene PP-g-MA or hydroxyl-functionalised polypropylene PP-co-OH. However, if the polar stabiliser also comprises a long chain hydrocarbon moiety this may also act as a compatibiliser, interacting with the polar functional groups on the filler and penetrating the thermoplastic polymer matrix and anchoring itself thereto through physical entanglements and secondary forces.

Nanofillers comprising other inorganic-based materials can also be used and, for example, very good results have been obtained using titanium dioxide nano-sized particles (for example, of diameter less than 20 nm) in amounts up about 5% by weight, based on the weight of the polymer composition.

In the method of the invention a plastics pipe is produced by extruding a polymeric composition comprising a polyolefin polymer comprising at least one polar stabiliser, wherein:

(i) the thermoplastic polymer is provided with pendant polar functional groups, and/or (ii) the thermoplastic polymer comprises an effective amount of at least one filler provided with pendant polar functional groups, and/or (iii) The thermoplastic polymer comprises a blend of a non-polar thermoplastic polymer and a thermoplastic polymer provided with pendant polar functional groups, to form at least an inner layer of the plastics pipe.

Any suitable extruder can be used, including, for example, a single screw extruder, or preferably, a conical disc type extruder or a co-rotating twin-screw extruder.

In a preferred method of the invention, the inner polymeric layer is extruded directly against an outer barrier layer, thereby avoiding the need to provide an adhesive layer between the inner polymeric layer and the outer polymeric layer.

In a first preferred embodiment of the method of the invention the thermoplastic polymer(s), the stabiliser(s) and the filler(s) if present are all mixed together in a conical extruder having good compounding properties and directly extruded into the metallic barrier pipe to form an inner polymeric layer comprising the inner passageway of the pipe.

In a second preferred embodiment of the method of the invention, the method comprises extruding a polymeric composition comprising a thermoplastic polymer comprising at least one polar stabiliser, wherein:

(i) the thermoplastic polymer is provided with pendant polar functional groups, and/or (ii) the thermoplastic polymer comprises an effective amount of at least one filler provided with pendant polar functional groups, and/or (iii) The thermoplastic polymer comprises a blend of a non-polar thermoplastic polymer and a thermoplastic polymer provided with pendant polar functional groups, into strands, pelletising the strands and extruding the pellets to form the inner polymeric layer.

Preferably the polymeric composition is extruded through a screen having a mesh size of at least 70.

In a particularly preferred embodiment of the method of the invention a bimodal compound is formed by mixing two narrow molecular weight polyolefins having different molecular weights, at least one of which is provided with polar functional groups, and adding one or more polar stabilisers and fillers to the compound, which is then extruded to form the inner layer of the plastics pipe.

The method of the invention is particularly applicable to the manufacture of stabilised cross-linked polyethylene (PEX-A) pipes and this is a separate and independent aspect of the invention. In the conventional method for the manufacture of PEX-A pipes the use of excess stabiliser is desirably avoided since the stabiliser is known to interfere with the peroxide cross-linking reaction. This limits the amount of stabiliser that can be added to the polymer composition and hence limits the protection afforded by the stabiliser to the polymer composition. In the method of this independent aspect of the present invention such difficulties may be avoided by using nanofillers such as layered silicate filler which can adsorb excess polar stabiliser, preventing it from interfering with the cross-linking reaction, but can release the polar stabiliser over time to provide long term protection to the cross-linked polymer. Accordingly, in general terms, this further aspect of the invention provides a method for extruding a stabilised cross-linked polyethylene polymer, which comprises extruding a polymer composition comprising the polyethylene polymer, a polar stabiliser and a thermally activated free radical generating cross-linking agent, characterised in that there is included in the polymer composition an effective amount of nanofiller, and in that the polar stabiliser is included in an amount such that it would significantly interfere with the cross-linking reaction but for the presence of the nanofiller, and in an amount such that the cross-link density is increased and/or the long term stability of the cross-linked polyethylene polymer is improved, or both, compared to the same polyethylene polymer containing the same amount of polar stabiliser but without the nanofiller.

Preferably the ratio of the components of the polymer composition is such that the polyethylene polymer is cross-linked to an extent of at least 50%, preferably at least 60%, more preferably 65-70%.

Preferably at least a portion of the polar stabiliser is mixed with the nanofiller before mixing into the polymer composition. In one embodiment of this aspect of the method of the invention a portion of the polar stabilizer is mixed with the nanofiller and the remainder of the polar stabilizer and the thermally activated free radical generating cross-linking agent added directly to the thermoplastic polymer. The polar stabilizer/nanofiller mixture is then added to the thermoplastic polymer composition in the extruder. It will be appreciated that the nanofiller in this aspect of the invention needs to be one having functional groups that can interact with the polar stabilizer. Particularly useful nanofillers for this application include, for example, layered silicates, and particularly useful polar stabilisers include sterically hindered phenols, for example, Irganox®1076.

In the method of the invention, it is also possible to modify the thermoplastic polymer to introduce pendant reactive polar groups in the extruder, for example, by free radical grafting or reactive extrusion. Free radical grafting in the melt involves a reaction between the polymer and a vinyl monomer. The reaction can occur in the presence of free radicals that are usually generated from the thermal decomposition of, for example, added peroxides, for example, dibenzoyl peroxide and 1,1-bis(tert-butylperoxy)-3,3,5-trimethylcyclohexane. Suitable vinyl monomers include, for example, acrylic and methacrylic acids and esters, for example, glycidyl methacrylate; maleic anhydride; Ricinoloxazoline maleinate; and other unsaturated carboxylic acid derivatives. Co-agents to minimise the extent of unwanted cross-linking can also be included. For example, styrene can be included as a co-agent when grafting glycidyl methacrylate (GMA) onto polyethylene. The grafted polyolefin can be extruded together with the filler and the polar stabiliser as a plastics pipe, or extruded as a masterbatch, if desired, and then mixed with, for example, a non-polar polyolefin and extruded to form the plastics pipe.

In a preferred embodiment, free radical grafting in the melt can be combined with cross-linking in the presence of nanofiller and polar stabiliser as described above.

In still further blends in accordance with the invention the thermoplastic polymer may be grafted or blended with a hyperbranched polymer, for example, a hyperbranched polyester.

In certain embodiments, notwithstanding any improvement in adhesion that may be obtained by using a polar functional thermoplastic polymer, it may still be necessary or desirable to include one or more adhesive layers in a multilayer pipe to ensure the desired level of bonding of the inner polymeric layer(s) to the barrier layer.

An adhesive layer can comprise, for example, a polymer comprising one or more functional groups that can react or interact with the inner surface of the barrier layer. Examples of suitable functional groups include carboxyl, carboxylic (for example maleic, phthalic, itaconic, citraconic, or glutaconic) anhydride, epoxy, hydroxyl, isocyanate, aldehyde, ester, acid amide, amino, hydrolysable silyl and cyano groups. Where the metal layer is treated to be compatible with a polyamide polymer, carboxyl, carboxylic anhydride, epoxy and hydroxyl groups are, among others, preferred because of their high reactivity with amino groups.

Various methods can be employed for preparing polymers containing a reactive functional group for use in the adhesive layer. According to a preferred method, an unsaturated monomer containing a reactive functional group is polymerised or copolymerised with another unsaturated monomer. Examples of the monomers containing reactive functional groups are unsaturated monocarboxylic acids such as acrylic, methacrylic, vinylacetic, pentenoic, hexenoic, octanoic, decenoic, dodecenoic and oleic acids, and derivatives thereof, for example, salts, esters, amides and anhyrides; unsaturated dicarboxylic acids such as fumaric, itaconic, citraconic and glutaconic acids, unsaturated alcohols such as allyl alcohol, butenol, pentenol, hexenol and dodecenol, and derivatives thereof; and unsaturated compounds containing epoxy groups, such as glycidyl methacrylate, glycidyl acrylate and acryl glycidyl ether. Monomers wherein one or more hydrogen atoms bonded to carbon are substituted by fluorine atoms are also included.

Preferred copolymers include copolymers of ethylene with at least one monomer chosen from (i) unsaturated carboxylic acids, their salts and their esters, (ii) vinyl esters of saturated carboxylic acids, (iii) unsaturated dicarboxylic acids, their salts, their esters, their half-esters and their anhydrides and (iv) unsaturated epoxides, these copolymers optionally being grafted with unsaturated dicarboxylic acid anhydrides such as maleic anhydride or unsaturated epoxides such as glycidyl methacrylate.

According to another preferred method for preparing a polymer containing a reactive group, a compound containing a reactive functional group is grafted to a polymer after its polymerization. The compound can, for example, contain a graft bonding group (e.g. an unsaturated bond) together with a functional group. The compound can be grafted to the polymer by a free radical reaction using peroxides or other initiators.

Suitable grafted polymers include, for example, grafts of polyethylene, polypropylene, copolymers of ethylene with at least one alpha-olefin, and blends of these polymers. The polymers may be grafted with, for example, unsaturated carboxylic acid anhydrides such as maleic anhydride; and glycidyl methacrylate.

The adhesive layer can also comprise a high temperature tolerant section covered with adhesive layers that give controlled bonding to the inner polymeric layer and the optionally corrugated barrier layer. The adhesive layers are advantageously chosen from co-polyamides and functionalised polyolefins.

Various other additives may be added to the thermoplastic polymer, including co-stabilisers, weather resistance additives, lubricants, nucleating agents, processing aids, pigments, coloring agents and the like.

In addition to the inner polymeric layer, multilayer pipes according to certain aspects of the invention can comprise one or more additional outer polymeric layers. For example, one or more outer polymeric layers can be extruded around the outer barrier layer to provide corrosion protection, environmental protection, or mechanical protection, or to provide additional strength, identification or decorative properties. The additional outer polymeric layer(s) can comprise any suitable polymer or blend of polymers including polyolefins, for example, polyethylene and polypropylene; polyamides, for example, Nylon; polyesters; and polyvinylhalides, for example, PVC. A particularly preferred additional outer polymeric layer comprises cross-linked polyethylene (PEX-a), which may be cross-linked after extrusion or formed from extruded cross-linked granules.

Where the plastics pipe comprises an inner layer, a metallic barrier layer and an outer layer, and the possibility of bending the pipe during installation is required, it is preferred for the compressive E-modulus of the inner layer to be lower than the compressive E-modulus of the outer layer. In preferred embodiments comprising this independent feature of the invention, the pipe can be bent without kinking and potential damage to the deposited barrier layer is minimized.

The plastics pipes of the invention can be used in a broad range of applications, but certain preferred embodiments find particular application in water transport, especially in pipes intended for the conveyance of hot (up to 110 deg) water, or warm water. In such applications, for example, in circulating domestic hot water systems, introduction of fresh water with high oxygen content can readily destroy a stabiliser system which has been weakened by premature migration of the stabiliser at high temperature.

The invention is illustrated by the following non-limiting Examples:

Example 1

Nucleated polypropylene, having —OH polar functional groups and a functionality of 0.2 weight percent is blended with from 1 to 50 weight percent, preferably from 5 to 40 weight percent, more preferably from 10 to 40 weight percent (calculated from the total weight of the composition) of talc and 5 weight percent of phenolic stabiliser to form a masterbatch. The talc used has a particle size in the range of from 0.01 to 100 μm, preferably from 0.1 to 10 μm. This masterbatch is then blended with a semi-crystalline polypropylene polymer, for example, of random block copolymer type, in a ratio of about 1:10.

The resultant compound is extruded using a conical disc extruder, a screen with a mesh size of at least 70, and an extrusion temperature of 220° C., directly onto the inner wall of an aluminium barrier layer tube to form an inner layer of thickness 1 mm. The inner layer is found to adhere strongly to the aluminium barrier layer with no noticeable delamination, such that a separate adhesive layer is not required.

The long-term performance of the resultant pipe is evaluated using the SEM method and is found to give excellent results. Testing by immersing the pipe in boiling water and measuring the OIT level indicates a very low level of leaching of the stabiliser from the pipe.

Example 2

77 weight % of a propylene homopolymer, 10 weight % of hydroxyl end group modified polypropylene, 8 weight % of talc with a mean particle diameter of 4 μm, and 5 weight % of calcium carbonate filler are blended to provide a polyolefin resin composition. This resin composition is then supplied to a twin-screw kneading and extruding machine and extruded into strands. The strands are then cut by a pelletizer into pellets. The pellets are fed into a single-screw extruder and extruded into tubular form. The tube is used to form the inner layer of a multilayer pipe.

Example 3

This example describes the manufacture of GMA grafted polyethylenes suitable for use in plastics pipe inner layers of the invention and their adhesion to an aluminium barrier foil.

Materials

The polyethylene (PE) was Dowlex 2344E (Dow Chemical Company). This ethylene-octene copolymer has a melt flow index of 0.7 g/10 min (190° C./2.16 kg). Glycidyl methacrylate (GMA) was the grafting monomer used in all of the grafting reactions. Styrene was used as received. 1,1-bis(tert-butylperoxy)-3,3,5-trimethylcyclohexane, Trigonox 29-C90 (Akzo Nobel) was the peroxide used in all of the grafting procedures. The commercial E/GMA copolymer used was AX 8840 (Atofina, functionality content: 8 wt %).

Melt Grafting Procedure

The melt free radical grafting was carried out in a co-rotating twin-screw midi-extruder (DSM, capacity 16 cm3, screw length 150 mm). The screw speed was 65 rpm during both the filling and mixing steps. In a typical procedure GMA was mixed into part of the polyethylene powder using a mixer for about 1 min. The peroxide (and styrene) was similarly and separately mixed into a quantity of polyethylene powder to yield a dry mixture. Finally these two mixtures were blended together in a mixer. The grafting time was 5 min. The initial concentration of the peroxide varied between 0.1 and 0.5 wt %, and that of the GMA between 1 and 5 wt %. The grafting temperature was 180° C.

Adhesion Testing

T-peel strengths of the various samples were measured using an Instron 4204 universal testing machine according to the standard ISO 11339:1993 (E). Film samples were prepared by pressing at 170° C. and 150 kN for 3 min, followed by a 3 min cooling period using the same pressing force. The thickness of the polymer films was 400±50 μm. Before the laminates were prepared, the aluminium sheets were cleaned with acetone to obtain a clean surface. The film samples were then melt-pressed between two aluminium plates (20×13 cm) (thickness 0.5 mm) at 170° C. and 150 kN for 3 min. Before testing, the laminates were conditioned for 2-3 days at 50% RH and 23° C., according to standard ISO 291. The 180° T-peel test was carried out using a crosshead speed of 100 mm/min, and the width of the test strips was 10 mm. The peel strength, expressed in N/m, was obtained from the mean of five measurements.

Results

A series of GMA grafting reactions were conducted onto the bulk PE. During these grafting reactions, styrene was used as a second monomer. Styrene promotes the grafting yield of GMA because it has a high reactivity towards both the macro-radicals and the GMA monomer itself. In other words, GMA is not grafted directly onto PE macro-radicals but via styrene and more specifically styryl macro-radicals. Grafting reactions without the use of styrene were also carried out. Table 1 shows the results of the different grafting reactions.

TABLE 1

Results of grafting procedures.

| Dowlex 2344E Polyethylene (wt %) | GMA (wt %) | Triganox 29 (wt %) | Styrene (wt %) | Peel strength (N/mm) |
|---|---|---|---|---|
| 97.7 | 2 | 0.3 | — | 0 |
| 97.4 | 2 | 0.3 | 0.3 | 0.41 |

The above results indicate that the use of styrene is required for the GMA to be successfully grafted onto the bulk PE. All the trials done without styrene resulted in materials that showed no appreciable improvement in adhesion towards Al.

Figure 1:
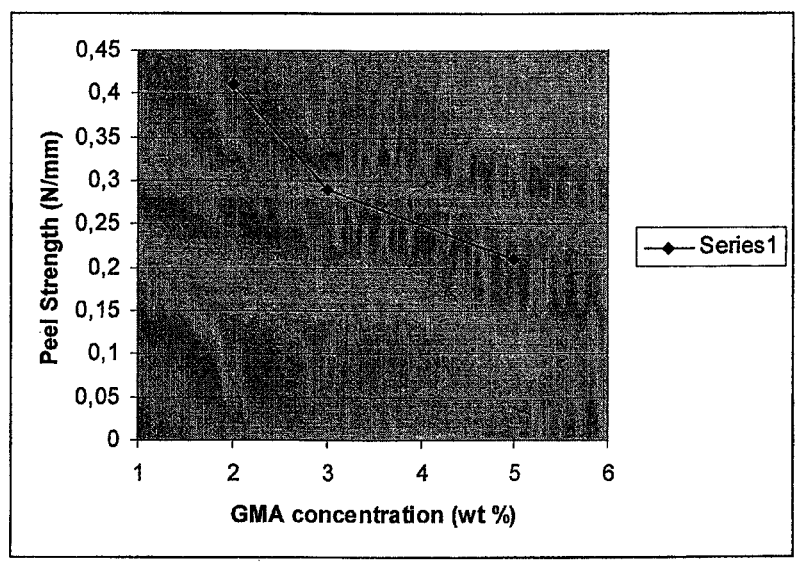
FIG. 1 illustrates the influence of GMA concentration (wt %) on peel strength (N/mm)

FIG. 1 illustrates that peel strength increased as the level of GMA in the graft reactions was lowered from 5 to 2. The GMA/Styrene ratio was kept constant in all three trials.

In addition to the grafted materials, the peel strengths of a commercial E/GMA copolymer, AX 8840 Atofina, and a commercial LLDPE adhesive, Yparex 8403R, DSM Engineering Plastics BV, were also measured. The peel strength of the E/GMA copolymer was 1.22 N/mm and the peel strength of the LLDPE adhesive was 1.84 N/mm.

Example 4

This example describes the use of blends of polyethylene with polar functional polyethylenes and with polar functional fillers and their effect on stabiliser leaching.

A commercial polyethylene containing a stabiliser package (Dowlex 2344) was melt-mixed with various polar functional polyethylenes and fillers using a co-rotating twin-screw midi-extruder (DSM, capacity 16 cm$^3$, screw length 150 mm) with an extrusion temperature of 195° C. and a screw speed of 65 rpm. Mixing time was 3 min and the total mass was 14 g. DMA test specimens were made by mini injection moulding (DSM) (mould temperature=60° C.). The mixtures are presented in table 2.

TABLE 2

The prepared mixtures (Dowlex 2344E as a polymer matrix).

| | Polar functional polyethylene/filler | Composition Dowlex/filler |
|---|---|---|
| 1 | E/BA/MAH (ME 0420, Borealis) | 95/5 |
| 2 | E/BA/MAH (ME 0420, Borealis) | 90/10 |
| 3 | E/BA/MAH (ME 0420, Borealis) | 85/15 |
| 4 | PE-co-GMA (Lotader AX 8840, Atofina) | 85/15 |
| 5 | PE-co-amine (S54) | 85/15 |
| 6 | Dowlex-g-OXA (UH7) | 85/15 |
| 7 | Dowlex-g-MAH (UH8) | 85/15 |
| 8 | PE-co-OH (S63) | 85/15 |
| 9 | Layered silicate (Cloisite 15A) | 90/10 |
| 10 | Layered silicate (Cloisite 15A) + Dowlex-g-MAH (UH8) | 75/10/15 |
| 11 | TiO2 (P160, Kemira) | 90/10 |

The ageing tests were performed in water at 115° C. (overpressure ~2.5 bar). Samples (40×4×1.5 mm) were put into an inert metal reactor (V=100 ml), which is equipped with pressure tester and surplus valve. The reactor is embedded in an oil bath (T=117° C.) and samples are taken at weekly intervals (in the beginning more often).

Figure 2:
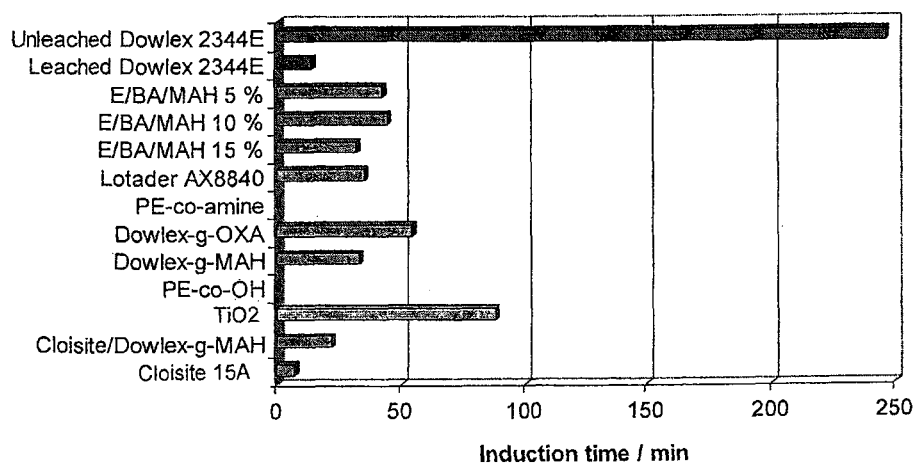
FIG. 2 illustrates the induction times (OIT) of samples after two weeks extraction in water (115° C.)
Figure 3:
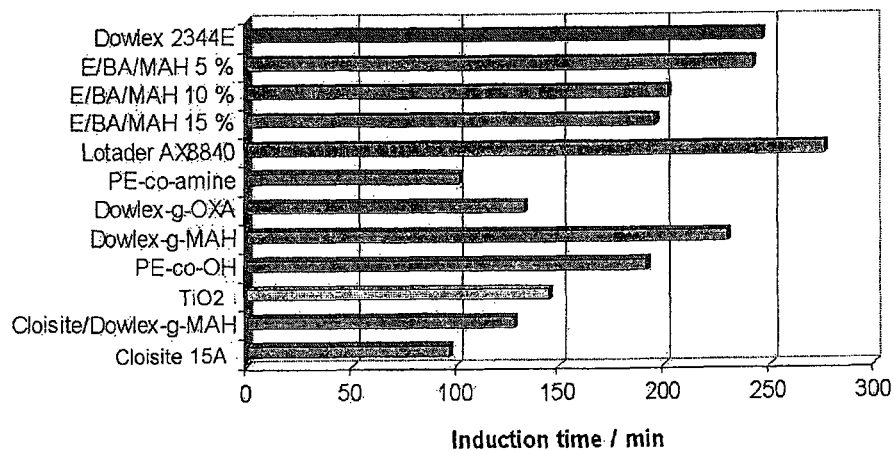
FIG. 3 illustrates the oxidation induction times before leaching (Dowlex 2344E as a polymer matrix)
Figure 4:
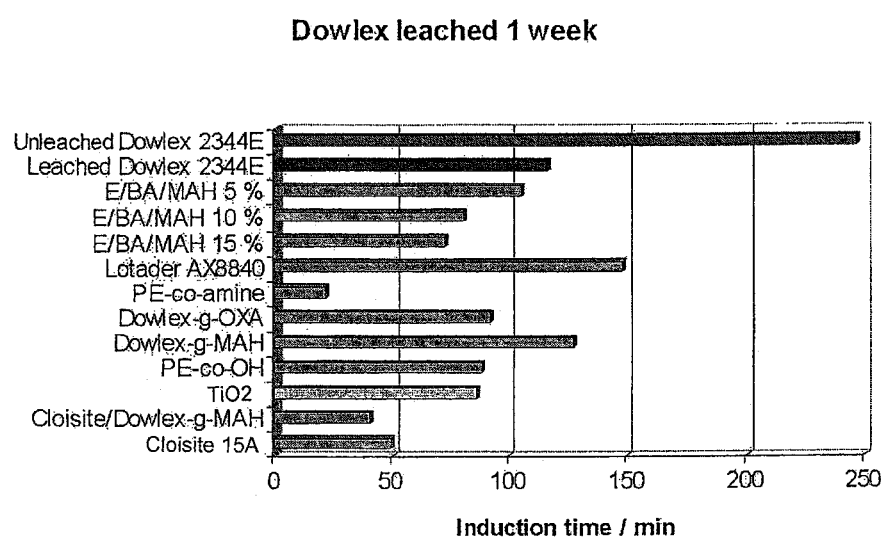
FIG. 4 illustrates the oxidation induction times after 1 week leaching (Dowlex 2344E as a polymer matrix)
Figure 5:
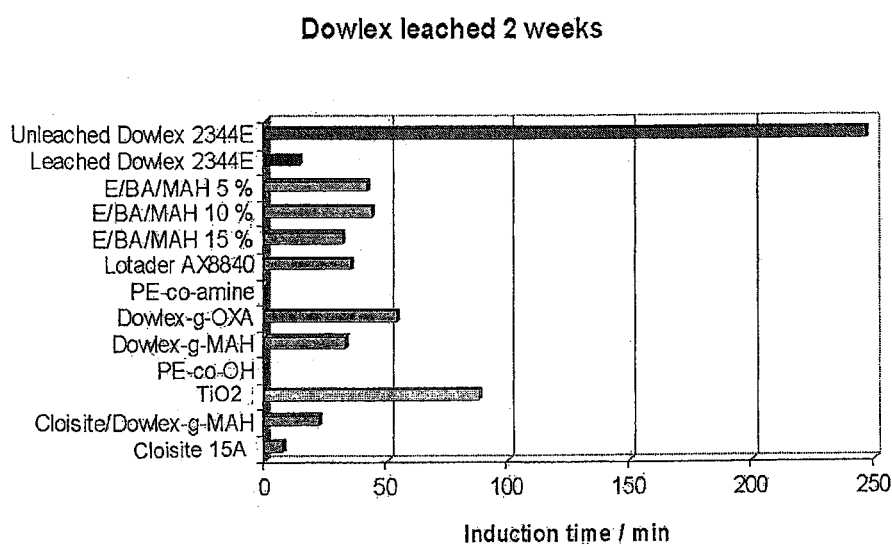
FIG. 5 illustrates the oxidation induction times after 2 weeks leaching (Dowlex 2344E as a polymer matrix)
Figure 6:
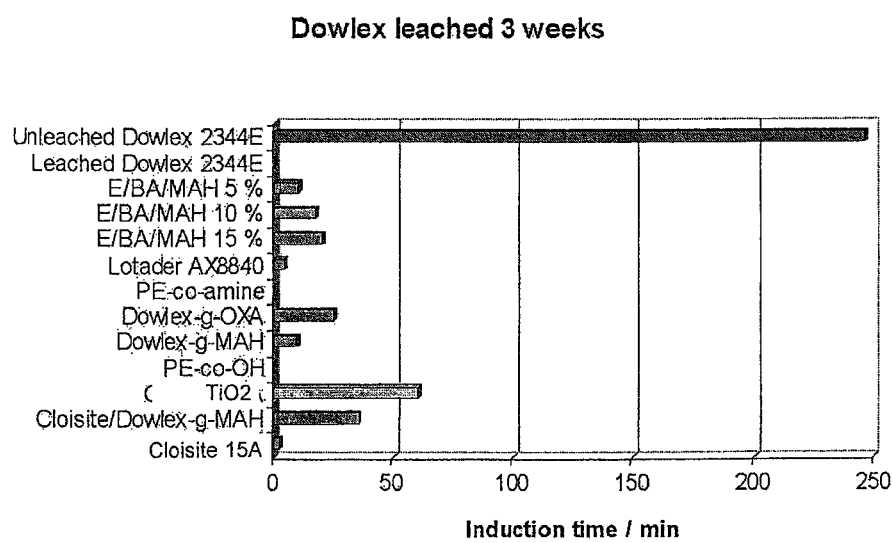
FIG. 6 illustrates the oxidation induction times after 3 weeks leaching (Dowlex 2344E as a polymer matrix)
Figure 7:
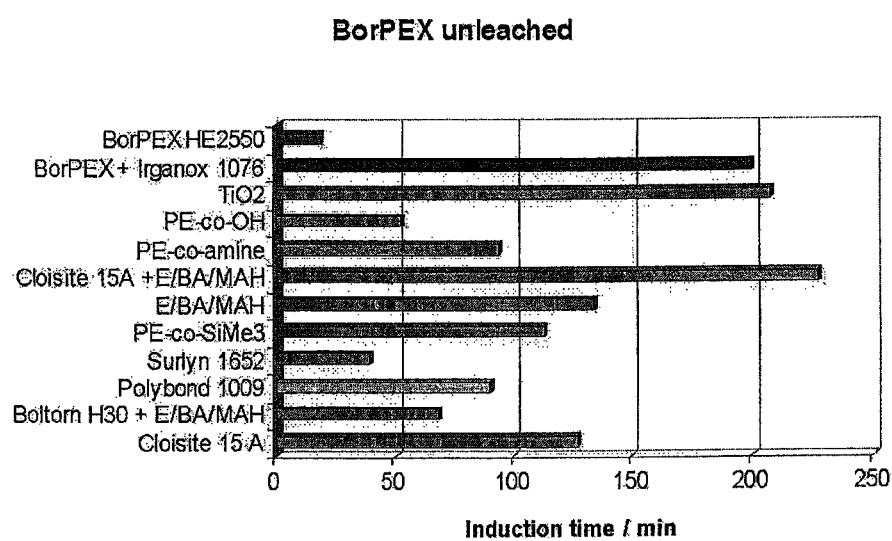
FIG. 7 illustrates the oxidation induction times before leaching (Bor PEX HE2550 as a polymer matrix)
Figure 8:
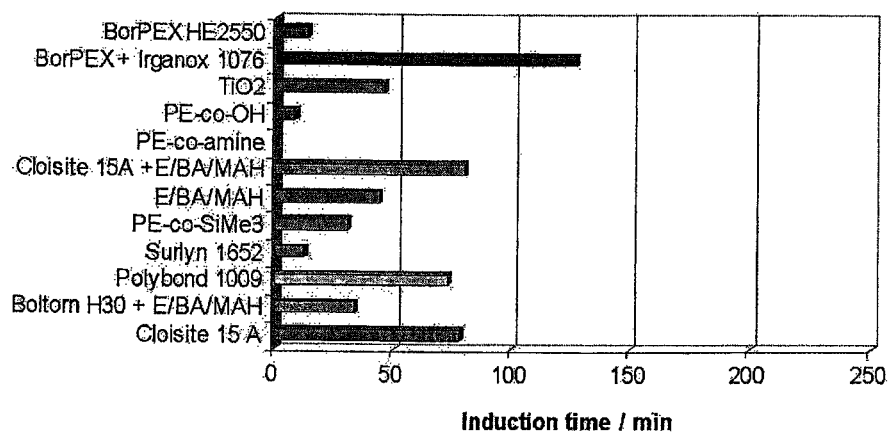
FIG. 8 illustrates the oxidation induction times after 5 days leaching (Bor PEX HE2550 as a polymer matrix)
Figure 9:
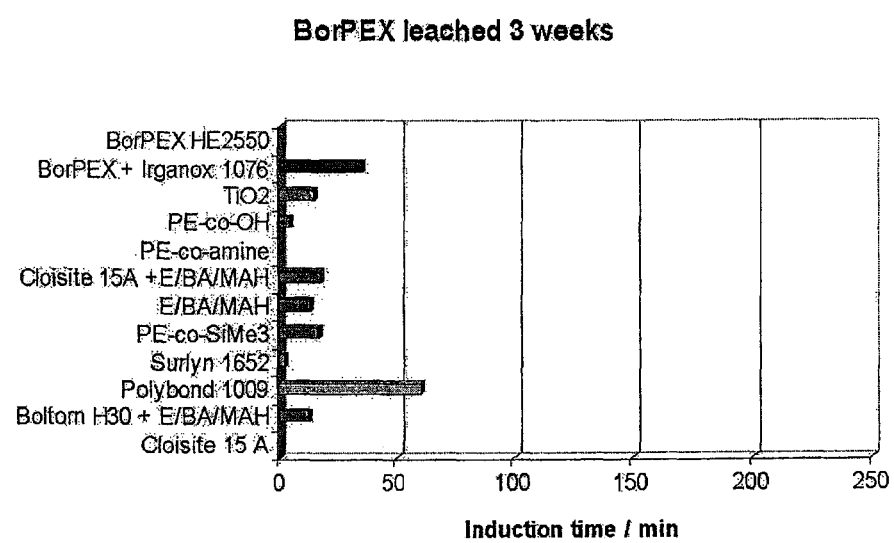
FIG. 9 illustrates the oxidation induction times after 3 weeks leaching (Bor PEX HE2550 as a polymer matrix)
Figure 10A:
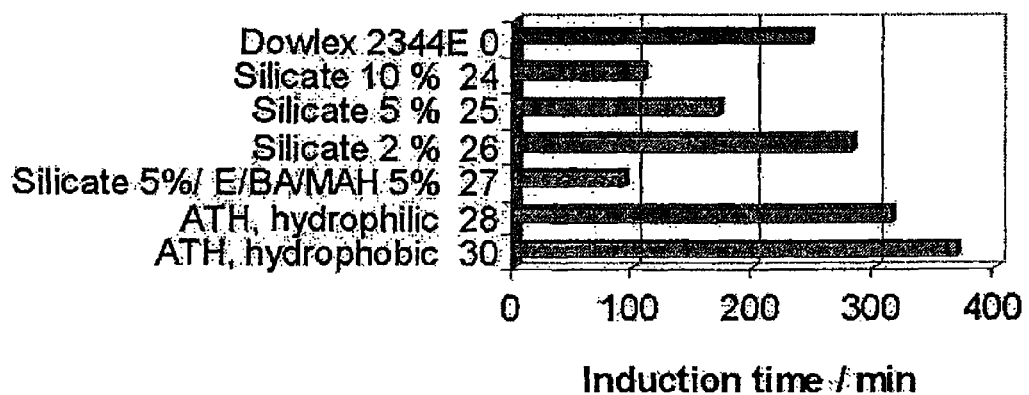
Figure 10B:
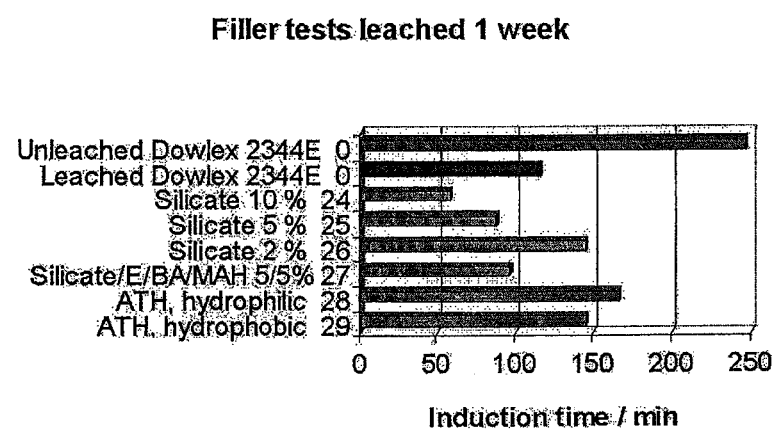
Figure 10C:
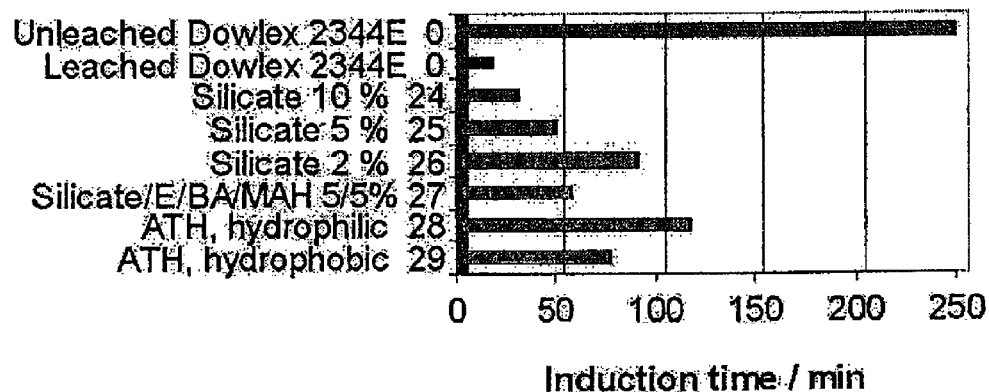
Figure 10D:
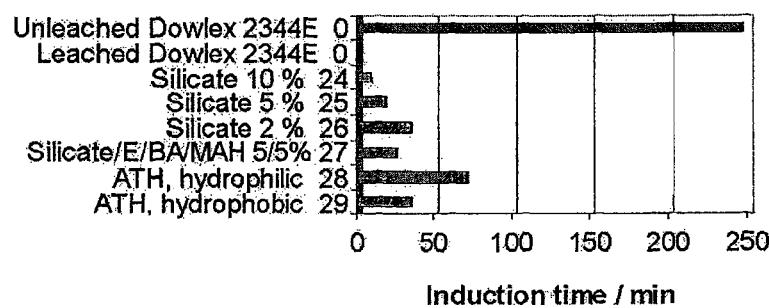

The oxidation induction times (OIT) of the samples were measured by DSC (T=190° C.). The results were compared with the OIT values of a fresh sample of Dowlex 2344E without ageing and Dowlex 2344E that had been similarly aged. The induction times of the samples, which have been kept two weeks in hot water, are presented in FIG. 2.

The results demonstrate that the stabiliser in Dowlex 2344E is substantially removed after ageing for two weeks (OIT~15). Blends in accordance with the invention with and without added fillers retain the stabiliser to a significant extent (OIT~30-50). Excellent results are obtained using the titanium dioxide nanofiller.

Example 5

This example describes the use of blends of polyethylenes with polar functional polyethylenes and with polar functional fillers and their effect on stabiliser leaching.

TABLE 3

Polymer matrices.

| Information | Dowlex 2344E | BorPEX, HE 2550 |
|---|---|---|
| Producer | The Dow Chemical Company | Borealis |
| Density | 0.933 g/cm3 | 0.956 g/cm3 |
| Melt flow rate (190° C./2.16 kg) | 0.7 g/10 min | |
| Melt flow rate (190° C./21.6 kg) | | 6 g/10 min |
| Stabilisers | stabilised | unstabilised |

(The BorPEX-polyethylene was stabilised by the addition of an antioxidant (0.5 w-%). The antioxidant was a sterically hindered phenol, Irganox ® 1076 (octadecyl 3-(3,5-di-tert-butyl-4-hydroxyphenol) propionate), Ciba Specialty Chemicals.)

Metallocene polymerised, PE-co-amine (S54 and S53), PE-co-OH(S63 and S56), PE-co-SiMe3 (M410).

TABLE 4

Commercial materials.

| Material | Trade Name | Manufacturer |
|---|---|---|
| E/BA/MAH | Borcoat ME 0420 | Borealis |
| PE-g-AA | Polybond ® 1009 | Uniroyal Chemical |
| E/GMA | Lotader ® AX8840 | Atofina |
| Layered silicate | Cloisite ®15A | Southern Clay Products |
| TiO2 | UV-Titan P160 | Kemira |
| Zn-neutralized ionomer | Surlyn ®1652 | DuPont |
| Hyperbranched polyester polymer | Boltorn H30 | Perstorp |
| Al (OH) 3; ATH | Apyral ®60D | Nabaltec |
| Al (OH) 3; ATH | Apyral ®60E | Nabaltec |

TABLE 5

Properties of commercial materials: functionalized polyethylenes.

| Trade Name | Functionality | Functionality degree, w-% |
|---|---|---|
| Borcoat ™ ME 0420 | butyl acrylate maleic anhydride | <1.0 |
| Polybond ® 1009 | acrylic acid | 6.0 |
| Lotader ® AX8840 | glycidylmethacrylate | 8.0 |
| Surlyn ® 1652 | methacrylic acid, where part is neutralized with $Zn^{2+}$ ion | 6.5, where part is $Zn^{2+}$ neutralized |

TABLE 6

Properties of commercial materials: fillers.

| Trade Name | Material | Modifier | Hydrophilicity |
|---|---|---|---|
| Cloisite ® 15A | Layered silicate, clay | 2M2HT* | hydrophobic |
| UV-Titan P160 | Spherical rutile titanium dioxide, crystal size typically 17 nm | stearic acid | hydrophobic |
| Apyral ® 60D | Aluminium hydroxide; ATH | — | hydrophilic |
| Apyral ® 60E | Aluminium hydroxide; ATH | stearic acid | hydrophobic |

*2M2HT is a quaternary ammonium salt, where HT is hydrogenated tallow (mainly C18) and M is a methyl group.

In addition Dowlex-g-OXA (UH7) and Dowlex-g-MAH (UH8) were prepared by reactive extrusion. Unfortunately in Dowlex-g-MAH maleic anhydride comonomers are not grafted on the polymer matrix.

Experimental

The materials were melt-mixed together by twin-screw midi extruder (DSM)(T=195° C., N=65 rpm, tmix=3 min, mtotal=14 g). DMA test specimens were carried out by mini injection moulding (DSM). The mould temperature was 60° C. for Dowlex-polyethylene and 100° C. for Bor PEX-polyethylene because of its higher viscosity.

TABLE 7

Polymer blends (Dowlex 2344E as a polymer matrix).

| Mixture | Compatibiliser/filler | Composition Dowlex/filler |
|---|---|---|
| 0 | — | 100/0 |
| 1 | E/BA/MAH (ME 0420, Borealis) | 95/5 |
| 2 | E/BA/MAH (ME 0420, Borealis) | 90/10 |
| 3 | E/BA/MAH (ME 0420, Borealis) | 85/15 |
| 4 | PE-co-GMA (Lotader AX 8840, Atofina) | 85/15 |
| 5 | PE-co-amine (S54) | 85/15 |
| 6 | Dowlex-g-OXA (UH7) | 85/15 |
| 7 | Dowlex-g-MAH (UH8) | 85/15 |
| 8 | PE-co-OH (S63) | 85/15 |
| 9 | Layered silicate (Cloisite 15A) | 90/10 |
| 10 | Layered silicate (Cloisite 15A) + Dowlex-g-MAH (UH8) | 75/10/15 |
| 11 | TiO2 (P160, Kemira) | 90/10 |

TABLE 8

Polymer blends (BorPEX HE2550 as a polymer matrix).

| Mixture | Compatibilizer/filler | Composition BorPEX/filler |
|---|---|---|
| 12 | PE (HE 2550, Borealis) | 100/0 |
| 13 | PE + antioxidant (Irganox 1076) | 100/0 |
| 14 | TiO2 (P160, Kemira) | 90/10 |
| 15 | PE-co-OH (S56) | 85/15 |
| 16 | PE-co-amine (S53) | 85/15 |
| 17 | Layered silicate (Cloisite 15A) + E/BA/MAH (ME 0420, Borealis) | 75/10/15 |
| 18 | E/BA/MAH (ME 0420, Borealis) | 85/15 |
| 19 | PE-co-SiMe3 (M410) | 85/15 |
| 20 | Zinc-ionomer (Surlyn 1652, Dupont) | 85/15 |
| 21 | PE-g-AA (Polybond 1009, Uniroyal Chemical) | 85/15 |
| 22 | OH-functionalized hyperbranched polymer (Boltorn H30, Perstorp) + E/BA/MAH | 75/10/15 |
| 23 | Layered silicate (Cloisite 15A) | 90/10 |

Further blends with layered silicate filler were prepared (using Dowlex 2344E as a polymer matrix) and compared with blends using either unmodified hydrophilic or hydrophobic aluminium trihydroxide (ATH) modified by stearic acid (mixtures 28 and 29).

TABLE 9

Additional polymer blends (Dowlex 2344E as a polymer matrix).

| Blend | Compatibiliser/filler | Composition Dowlex/filler |
|---|---|---|
| 24 | Layered silicate (Cloisite 15A) | 90/10 |
| 25 | Layered silicate (Cloisite 15A) | 95/5 |
| 26 | Layered silicate (Cloisite 15A) | 98/2 |
| 27 | Layered silicate (Cloisite 15A) + E/BA/MAH (ME 0420, Borealis) | 90/5/5 |
| 28 | ATH (Apyral 60D) | 90/10 |
| 29 | ATH modified with stearic acid (Apyral 60E) | 90/10 |

Oxidation Induction Times

The ageing tests were performed in water at 115° C. (overpressure ~2.5 bar). Samples (40×4×1.5 mm) were put into an inert metal reactor (V=100 ml), equipped with pressure tester. The reactor is immersed in an oil bath (T=117° C.) and samples are taken at weekly intervals (in the beginning more often).

The oxidation induction times were measured by DSC (T=190° C.). The induction time indicates the amount of remaining efficient antioxidant in the polymer.

The results are set out in FIGS. 3 to 10 and demonstrate the improvements obtained with the pipe and method of the invention.

Example 6

This example describes the use of two stabilized polyethylene copolymers with varying quantities of titanium dioxide as a polar functional filler and its effect on stabiliser leaching over time.

The procedure of Example 5 was repeated using Dowlex 2344 (stabilized ethylene/octene-1 copolymer, melt index (190° C./2.16 kg) 0.7 g/10 min, density 0.933 g/cm$^3$) and Dowlex 2388 (stabilized ethylene/octene-1 copolymer, melt index (190° C./2.16 kg) 0.7 g/10 min, density 0.941 g/cm$^3$) with respectively 2%, 5% and 10% of titanium dioxide nanofiller (P160 Kemira). The oxidation induction times were measured by DSC (T=190° C.) over a three week period and the results set out in FIGS. 11 and 12

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A plastics pipe having (a) an outer layer and (b) a stabilised inner layer and (c) a metallic barrier layer disposed between the inner and outer layer,
    wherein the metallic barrier layer is selected from the group consisting of a sputtered metal layer, a galvanically-coated metal layer, an electro-deposited metal layer, a wound metal sheet and a corrugated metal sheet, and
    wherein the stabilised inner layer comprises:
    an extruded thermoplastic polymer, wherein the thermoplastic polymer is (i) a polar functional polyolefin polymer, or (ii) a polyolefin polymer, or (iii) a combination of a polar functional polyolefin polymer and a polyolefin polymer, and wherein the thermoplastic polymer is selected from the group consisting of: polyethylene, cross-linked polyethylene and polypropylene;
    at least one polar stabilizer; and
    at least one particulate filler provided with pendant polar functional groups, comprising platelets and having an aspect ratio of from 10 to 150.

2. A plastics pipe according to claim 1, wherein the inner layer comprises a polar functional polyolefin polymer.

3. A plastics pipe according to claim 2, wherein the polar functional polyolefin polymer comprises a co-polymer of an olefin with an olefinically unsaturated comonomer having a polar functional substituent group.

4. A plastics pipe according to claim 3, wherein the comonomer is selected from the group consisting of an unsaturated aliphatic or aromatic acid, an unsaturated anhydride, an unsaturated ester, and an unsaturated alcohol.

5. A plastics pipe according to claim 3, wherein the comonomer is selected from the group consisting of acrylic acid, maleic anhydride, 10-undecenol, butyl acrylate, and glycidyl methacrylate.

6. A plastics pipe according claim 3, wherein the polar functional polyolefin polymer is selected from the group consisting of polyolefin polymers comprising oxy, epoxy, and —OH groups.

7. A plastics pipe according to claim 3, wherein the polar functional polyolefin polymer is selected from the group consisting of an acrylic acid functionalised polypropylene, a maleic anhydride functionalised polyethylene, a maleic anhydride functionalised polypropylene, and a maleic anhydride functionalised ethylene-propylene rubber.

8. A plastics pipe according to claim 3, wherein the olefinically unsaturated comonomer is present in an amount of from 1 to 20 weight percent.

9. A plastics pipe according to claim 3, wherein the polar functional polyolefin polymer is a polar functional polypropylene.

10. A plastics pipe according to claim 9, wherein the polar functional polypropylene is oxypolypropylene.

11. A plastics pipe according to claim 2, wherein the inner layer comprises a blend of a non-polar polyolefin polymer and a polar functional polyolefin polymer wherein the non-polar polyolefin polymer is present in an amount of at least 50 weight percent.

12. A plastics pipe according to claim 11, wherein the non-polar polyolefin polymer is present in an amount of from 80 to 99 weight percent.

13. A plastics pipe according to claim 11, wherein the inner layer comprises a blend of a polypropylene and a polar functional polypropylene.

14. A plastics pipe according to claim 13, wherein the polar functional polypropylene is present in the blend in an amount of from 3 to 20 weight percent.

15. A plastics pipe according to claim 2, wherein the non-polar polyolefin polymer is present in an amount of less than 50 weight percent.

16. A plastics pipe according to claim 15, wherein the non-polar polyolefin polymer is present in an amount of from 1 to 20 weight percent.

17. A plastics pipe according to claim 13, wherein the polypropylene is a polypropylene homopolymer.

18. A plastics pipe according to claim 17, wherein the polypropylene homopolymer comprises at least 70 weight per cent of fractions having a weight average molecular weight of at least $7 \times 10^5$.

19. A plastics pipe according to claim 13, wherein the polar functional polypropylene has a lower molecular weight than the polypropylene whereby the combination forms a bimodal material.

20. A plastics pipe according to claim 11, wherein the inner layer comprises a polar functional polyethylene polymer.

21. A plastics pipe according to claim 20, wherein the inner layer comprises a blend of a polyethylene polymer and a polar functional polyethylene polymer.

22. A plastics pipe according to claim 21, wherein the polar functional polyethylene polymer is present in the blend in an amount of from 0.5 to 20 weight per cent.

23. A plastics pipe according to claim 15, wherein the inner layer comprises a blend of a polar functional polypropylene and a linear low density polyethylene.

24. A plastics pipe according to claim 20, wherein the inner layer comprises a cross-linked polyethylene blend.

25. A plastics pipe according to claim 1, wherein the barrier layer is selected from the group consisting of aluminium, stainless steel and copper.

26. A plastics pipe according to claim 1, wherein the barrier layer is directly bonded to the inner polymeric layer.

27. A plastics pipe according to claim 1, wherein the inner polymeric layer comprises a polymeric matrix provided with functional groups that increase the wetting of the metallic barrier layer by the inner polymeric layer.

28. A plastics pipe according to claim 26, wherein the pendant polar functional groups decrease the contact angle of the polymeric matrix with the metallic barrier layer.

29. A plastics pipe according to claim 1, wherein the surface of the metallic barrier layer has been modified in order to improve its wetting behaviour.

30. A plastics pipe according to claim 29, wherein the metallic barrier layer has been treated by physical surface modification.

31. A plastics pipe according to claim 30, wherein the physical surface modification is selected from the group consisting of plasma treatment, abrasion, ablation, and cleaning.

32. A plastics pipe according to claim 29, wherein the metallic barrier layer has been treated by chemical surface modification.

33. A plastics pipe according to claim 32, wherein the chemical surface modification is selected from the group consisting of solvent cleaning, chemical cleaning, treatment with chemical modifying agents to introduce surface functional groups, deposition of surface layers by plasma deposition of a polymeric layer containing functional groups, deposition of a glassy layer, and other surface coating techniques.

34. A plastics pipe according to claim 1, wherein the polar stabiliser is selected from the group consisting of a thermal stabiliser, an antioxidant, a radical scavenger, an anti-ageing compound, a light stabiliser and a UV stabiliser.

35. A plastics pipe according to claim 34, wherein the polar stabiliser is selected from the group consisting of a sterically-hindered phenol, a phosphite, a phosphonite, a benzotriazole and a sterically-hindered amine.

36. A plastics pipe according to claim 34, wherein the polar stabiliser is present in the inner polymeric layer in an amount of from 0.01 to 5 weight per cent, based upon the weight of the inner polymeric layer.

37. A plastics pipe according to claim 1, wherein the filler is inorganic-based particulate filler provided with functional polar groups disposed on its surface.

38. A plastics pipe according to claim 37, wherein the filler is selected from the group consisting of talc, mica, calcium carbonate, kaolin, clay, magnesium hydroxide, calcium silicate, carbon black, graphite, iron powder, silica, diatomite, titanium oxide, iron oxide, pumice, antimony, dolomite, dawsonite, zeolitic filler, vermiculite, montmorillonite and hydrated alumina.

39. A plastics pipe according to claim 38, wherein the filler has a mean particle diameter of up to 10 μm.

40. A plastics pipe according to claim 38, wherein the filler is present in an amount of from 0.5 to 25 weight per cent.

41. A plastics pipe according to claim 38, wherein the filler is selected from the group consisting of talc, mica, calcium carbonate and titanium dioxide.

42. A plastics pipe according to claim 41, wherein the talc has a particle size in the range of from 0.01 to 200 μm, a maximum equivalent diameter of about 25 μm, and an average thickness of less than 0.5 μm, and is present in an amount of from 1 to 5 weight per cent.

43. A plastics pipe according to claim 41, wherein the mica has a particle size of less than 74 μm and an aspect ratio of from 10 to 150 μm, and is present in an amount of less than 5 weight per cent.

44. A plastics pipe according to claim 41, wherein the calcium carbonate filler is present in an amount of from 0.5 to 20 weight per cent, based on the weight of the inner polymeric layer.

45. A plastics pipe according to claim 41, wherein the filler comprises a mixture of calcium carbonate and talc.

46. A plastics pipe according to claim 37, wherein the filler comprises titanium dioxide.

47. A plastics pipe according to claim 1, wherein the filler is a nanofiller.

48. A plastics pipe according to claim 47, wherein the nanofiller is present in an amount of from 1% to 5% by volume, based on the volume of the inner polymeric layer.

49. A plastics pipe according to claim 47, wherein the particles of the nanofiller are uniformly dispersed in the inner polymeric layer.

50. A pipe according to claim 1, wherein an adhesive layer is disposed between the inner polymeric layer and the metal barrier layer.

51. A pipe according to claim 50, wherein the adhesive layer comprises a polymer comprising at least one functional group selected from the group consisting of carboxyl, carboxylic, anhydride, epoxy, hydroxyl, isocyanate, aldehyde, ester, acid amide, amino, hydrolysable silyl and cyano.

52. A plastics pipe according to claim 50, wherein the polymer is selected from the group consisting of polymers and co-polymers of an unsaturated monocarboxylic acid, an unsaturated dicarboxylic acid, an unsaturated alcohol and an unsaturated epoxy compound.

53. A plastics pipe according to claim 50, wherein the polymer is selected from the group consisting of co-polymers of ethylene with at least one monomer selected from unsaturated carboxylic acids, their salts and their esters, vinyl esters of saturated carboxylic acids, unsaturated dicarboxylic acids, their salts their esters, their half-esters and their anhydrides and unsaturated epoxides.

54. A plastics pipe according to claim 50, wherein the polymer is selected from the group consisting of a grafted polymer of ethylene, a grafted polymer of propylene and a grafted co-polymer of ethylene with at least one alpha-olefin.

55. A plastics pipe according to claim 1, wherein the outer layer is a polymeric layer.

56. A plastics pipe according to claim 55, wherein the outer polymeric layer comprises cross-linked polyethylene.

57. A method of producing a plastics pipe having (a) an outer layer and (b) a stabilised inner layer and (c) a metallic barrier layer disposed between the inner and out layer, which comprises extruding a polymeric composition to form at least the stabilised inner layer of the plastics pipe,
wherein the metallic barrier layer is selected from the group consisting of a sputtered metal layer, a galvanically-coated metal layer, an electro-deposited metal layer, a wound metal sheet and a corrugated metal sheet, and
wherein the polymeric composition which forms at least the stabilised inner layer comprises:
a thermoplastic polymer, wherein the thermoplastic polymer is (i) a polar functional polyolefin polymer, or (ii) a polyolefin polymer, or (iii) a combination of a polar functional polyolefin polymer and a polyolefin polymer, and wherein the thermoplastic polymer is selected from the group consisting of: polyethylene, cross-linked polyethylene and polypropylene;
at least one polar stabiliser; and
at least one particulate filler provided with pendant polar functional groups, comprising platelets and having an aspect ratio of from 10 to 150.

58. A method according to claim 57, wherein the polymeric composition-comprises the polar functional polyolefin polymer.

59. A method according to claim 58, wherein the polymeric composition-comprises a blend of the polyolefin polymer and the polar functional polyolefin polymer.

60. A method according to claim 59, wherein a bimodal compound is formed by mixing two narrow molecular weight polyolefins having different molecular weights, at least one of which is provided with polar functional groups, adding at least one polar stabiliser and at least one filler to the compound, and extruding the compound to form at least the stabilised inner layer of the plastics pipe.

61. A method according to claim 59, wherein the polymeric composition is extruded directly onto the metallic barrier layer.

62. A method according to claim 57, wherein the metallic barrier layer comprises a metallic barrier tube, and the polyolefin, the polar functional polyolefin polymer, the at least one polar stabiliser and the particulate filler are mixed together in an extruder and directly extruded into the metallic barrier tube to form the stabilised inner comprising an inner passageway of the pipe.

63. A method according to claim 57, wherein the polymeric composition comprises cross-linkable polyethylene.

64. A method according to claim 57, wherein the thermoplastic polymer is modified to introduce pendant reactive groups in the extruder by a reaction selected from the group consisting of free radical grafting and reactive extrusion.

65. A method according to claim 54, wherein the reaction comprises reacting the thermoplastic polymer with a vinyl monomer in the presence of a free radical generator.

66. A method according to claim 65, wherein the free radical generator is a peroxide.

67. A method according to claim 65, wherein the reaction takes place in the presence of a co-agent to minimise the extent of unwanted cross-linking.

68. A method according to claim 67, wherein the co-agent is styrene.

69. A method according to claim 65, wherein the vinyl monomer is glycidyl methacrylate.

70. A method of conveying hot water, comprising:
(a) providing a multilayer pipe, wherein the multilayer pipe is a pipe as claimed in claim 1; and
(b) conveying hot water through the multilayer pipe.

71. A method according to claim 70, wherein the multilayer pipe is a pipe as claimed in claim 5.

* * * * *